June 4, 1963   A. J. KOSER   3,092,013
ROTARY BARBECUE GRILL
Filed April 3, 1961   2 Sheets-Sheet 1
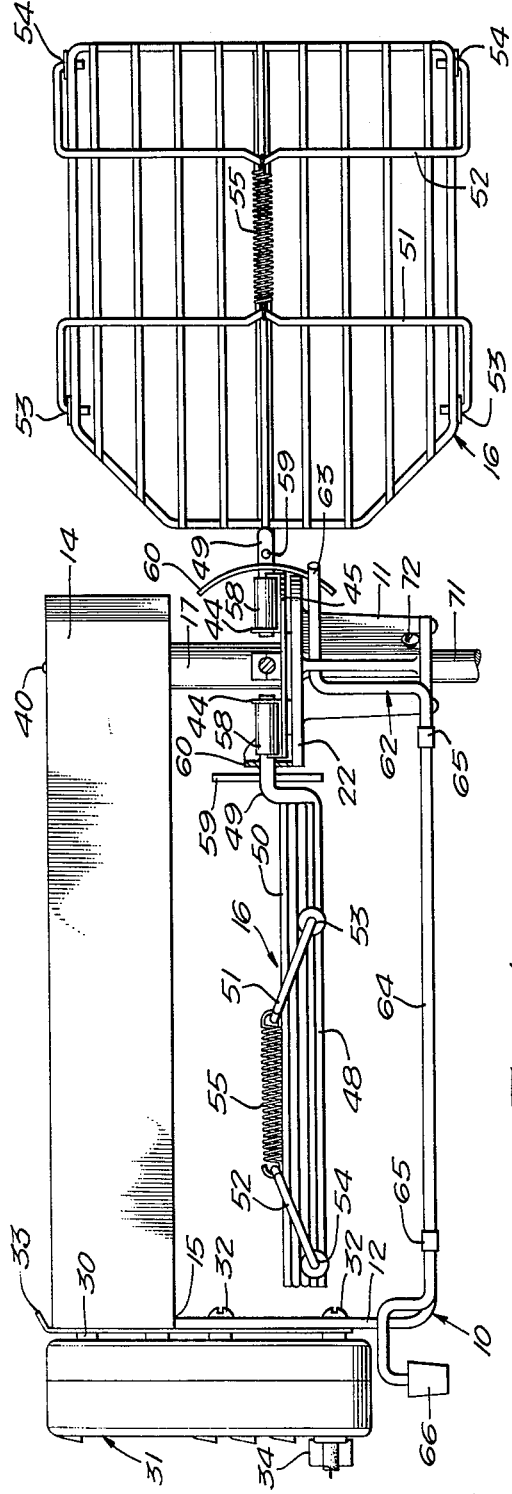
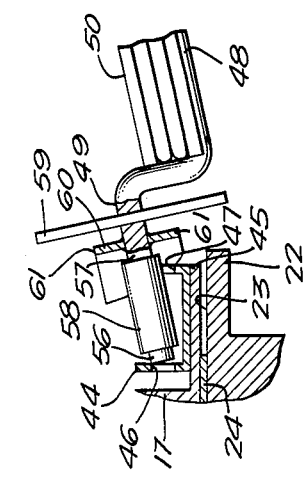
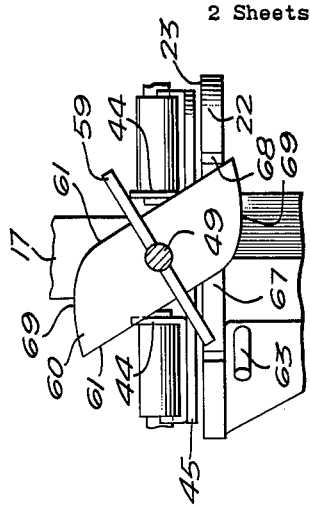
ARTHUR J. KOSER
INVENTOR.
BY *Lyon & Lyon*
ATTORNEYS

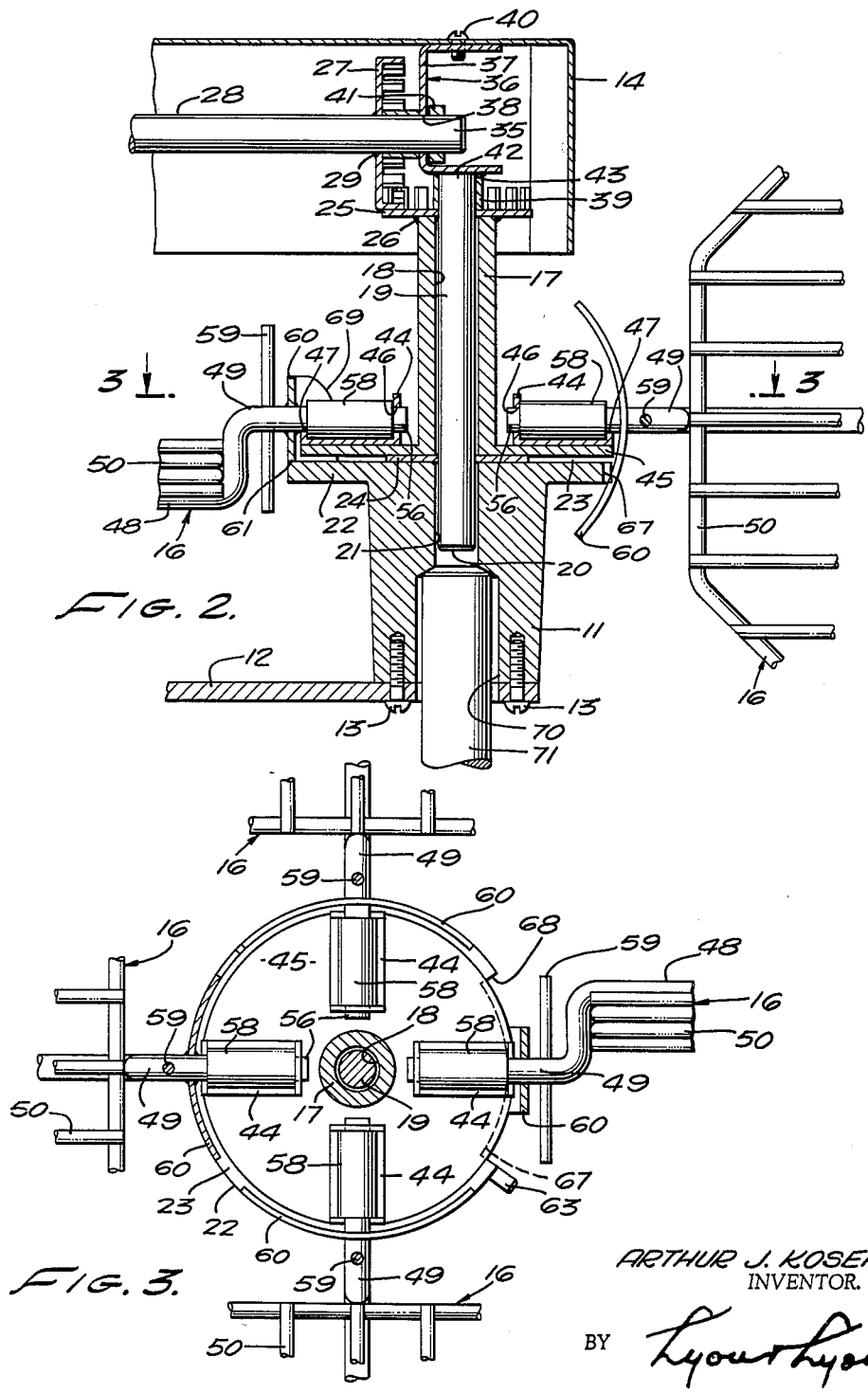

3,092,013
ROTARY BARBECUE GRILL
Arthur J. Koser, 1800 Radiance Drive,
Bakersfield, Calif.
Filed Apr. 3, 1961, Ser. No. 100,196
11 Claims. (Cl. 99—397)

This invention relates to a rotary barbecue grill and in particular constitutes an improvement of the type of rotary barbecue grill which is the subject of my United States Letters Patent No. 2,883,924.

In the barbecuing of meat or other food over an open fire, it is generally necessary to turn the food one or more times so that different sides are presented to the fire thereby promoting even cooking of the food without excessive cooking on any one side. It is also commonly a problem when cooking over hot coals that the juices liberated from the meat or other foods due to the increase in temperature fall upon the coals and cause flare-ups which tend to char the food if allowed to continue.

In the barbecuing of food the personal preference of the intended consumers often dictates that certain individual servings be allowed to cook longer or shorter than others. It is also an inherent problem in the loading of a spit, open work grill, that is to be rotated with the meat or food that it is difficult to balance the food in the spit, open work grill, relative to the point or points of rotation so that when placed in any one position, the spit, open work grill, will not tend to turn so as to always present the same side of the food to the fire.

It is therefore a principal object of this invention to provide a rotary barbecue grill in which novel means are provided for turning the individual open work grills top for bottom upon rotation of the open work grills about a vertical axis.

Another object of this invention is to provide a rotary barbecue grill in which a plurality of individual open work grills are removably mounted in a novel manner on a member rotatable about a vertical axis.

Another object of this invention is to provide a rotary barbecue grill in which novel means are provided for engaging the individual open work grill assemblies to permit rotation about the vertical axis while preventing tilting or turning about a horizontal axis except when turned top for bottom at one position in the rotation.

Other and more detailed objects and advantages of this invention will appear from the following description and the accompanying drawings.

In the drawings:

FIGURE 1 is an elevational view of the preferred embodiment of this invention with the front and rear grill assemblies removed for clarity.

FIGURE 2 is an enlarged fragmentary sectional elevation similar to FIGURE 1.

FIGURE 3 is a sectional plan view taken substantially on the line 3—3 as shown in FIGURE 2.

FIGURE 4 is a fragmentary elevational view showing one of the grill assemblies being inserted in its retainer.

FIGURE 5 is a fragmentary elevational view illustrating the inner engagement of certain portions of the device to affect the turning of the grill assemblies top for bottom.

Referring now to the drawings, a frame 10 is provided for supporting the various parts of the apparatus of this invention and as shown this frame may include a support column 11 attached to a base 12 by screws 13 and a cover housing 14 also affixed to the base 12 at 15 by any convenient means.

In order to support the open work grill assemblies, generally designated 16, a hub 17 is rotatably mounted on the support column 11. The hub 17 has a central bore 18 which rotatably engages the vertical stub shaft 19 which in turn has a lower end 20 extending into a central bore 21 provided in the support column 11. The support column 11 has a flange portion 22 which may be provided with an upwardly facing surface 23 to support a thrust washer 24 which in turn supports the hub 17, as most clearly illustrated in FIGURE 2.

In order to rotate the hub 17, the upper end may be provided with a crown gear 25 secured to the hub by any convenient means such as weld 26. The crown gear 25 mates with a second crown gear 27 mounted on a shaft 28 by any convenient means such as weld 29 so that rotation of the shaft 28 causes rotation of hub 17 through the crown gears 27 and 25. One end 30 of the shaft 28 may be connected to a source of rotary power such as a slow speed electric motor 31 which is mounted on the base 12 by screws 32. A shield 33 is provided to protect the motor 31 from the heat of the barbecue fire. A switch 34 may be provided for turning the electric motor 31 on and off, as desired.

The other end 35 of the shaft 28 is supported by bearing assembly 36 which may include a frame member 37 having a bore 38 to accommodate the shaft 28 and a sleeve 39 secured to the frame 37. A screw 40 secures the bearing assembly 36 to the cover housing 14. A collar 41 secured to the shaft 28 prevents axial separation of the shaft and the bearing assembly 36. The sleeve 39 is mounted on the upper end 42 of the stub shaft 19 by any convenient means such as weld 43.

A plurality of retainers 44 are mounted on the flange portion 45 of the hub 17. Each retainer has an aperture 46 preferably in the shape of a round hole and an upwardly facing semi-circular opening 47 spaced from the aperture 46.

The open work grill assemblies 16 are provided for supporting the meat or other food to be barbecued, and as shown in the drawings, these grill assemblies may include a relatively flat grill 48 having a stud 49 projecting from one end, a second relatively flat grill 50 cooperating with the first grill 48 to maintain the meat or food between the two grills throughout rotation and turning of the grill assembly. The grill 50 may be urged toward the grill 48 by means of cross-bars 51 and 52 pivotally mounted on the grill 48 at 53 and 54, respectively, and a tension spring 55 urging the cross-bars 51 and 52 toward each other and engaging the outer surface of the grill 50 to thereby urge the grill 50 toward the grill 48.

In order to support the grill assemblies 16 in the retainers 44, the stud 49 projecting from the grill assembly is provided with a journal 56 on its extreme end which may be inserted in the aperture 46 and a journal portion 57 which rotatably engages the semi-circular opening 47. An enlarged portion 58 between the journals 56 and 57 prevents axial movement of the stud 49 when the stud is horizontally positioned in the retainer 44 as best shown in FIGURE 2. The stud 49 is inserted in the retainer 44 as illustrated in FIGURE 4.

Means are provided for inverting the grill assembly and as shown in the drawings, these means may include a pin 59 and a fin 60 mounted on the stud 49 and engageable with movable trip means mounted on the frame 10 as described below. The fins 60 may be arcuate in shape having a radius equal to the distance from the center of stub shaft 19 to the fin when the grill assembly is mounted in the retainer 44. Two edges 61 of the fin 60 are adapted to engage the surface 23 of flange 22 on the support column 11 while the hub 17 is rotating about the vertical axis of stub shaft 19. This engagement between edge 61 and surface 23 serves to maintain the grills 48 and 50 in a relatively horizontal plane regardless of unbalanced loading of food in the grill assembly with respect to the axes of stud 49.

In order to be able to selectively invert the grill assemblies or permit them to continue to rotate about the vertical axis without turning, a trip means generally designated 62 is provided which may include a projecting lever 63, a horizontal extension 64 slidably mounted in clips 65 secured to the base 12 and a handle 66 for moving the trip means 62 such that the lever 63 is moved in and out of the path of the pins 59 as the grill assemblies 16 are rotated about the vertical axis. When it is desired to invert a grill assembly top for bottom, the lever 63 is moved into the path of the pins 59 as the grill assemblies rotate about the vertical axis. A portion of the flange 22 is relieved at 67 forming a gap to allow the fin 60 to rotate when the lever 63 engages the pin 59. A shoulder 68 at one end of the relieved portion or gap 67 is spaced from the lever 63 so that upon continued rotation of the hub 17 to the point where the pin 59 and the lever 63 become disengaged, the edge 61 of the fin 60 catches the shoulder 68 as illustrated in FIGURE 5 to cause the completion of the inverting of the grill assembly upon the continued rotation of hub 17.

The fin 60 is provided with rounded edges 69 to provide adequate clearance for rotation within the gap 67 and to prevent the fin from catching on shoulder 68. The relieved portion or gap 67, however, is not of sufficient size to allow free rotation of the grill assembly without turning of the hub 17 since the arms of the fin 60 are longer than the gap 67. Thus, when the lever 63 is retracted so as to not engage the pin 59 to start the turning of the grill assembly top for bottom, the edge 61 continues to engage the surface 23 of the flange 22 to maintain the grills in a relatively horizontal position throughout the rotation of the hub 17.

A bore 70 may be provided on the support column 11 and base 12 to accommodate the center post 71 of a conventional circular barbecue pit or brazier. One or more set screws 72 may be threadedly received in the support column 11 and engage the center post 71 to prevent relative movement between the frame 10 and the center post 71.

From the foregoing, it will be seen that a structure is provided which permits individual and easy insertion and removal of separate grill assemblies, that the grill assemblies need not be perfectly balanced to be maintained in a relatively horizontal plane throughout the cooking cycle and that the grills may be inverted once during each revolution about the vertical axis or be allowed to revolve about the vertical axis without inverting, as desired.

Having fully described my invention, it is to be understood that I do not wish to be limited to the details herein set forth or to the details illustrated in the drawings, but my invention is of the full scope of the appended claims.

I claim:

1. In a barbecue device, a frame, a rotary member mounted on said frame for rotation about a vertical axis, a plurality of grill assemblies each having a stud projecting from one end, a plurality of retainers carried by the said rotary member, each stud being removably and rotatably received in one of said retainers, flange means mounted on said frame adjacent said rotary member, means on said grill assemblies for engaging said flange means to prevent turning of said grill assemblies about the axes of said studs, each grill assembly being provided with means transversely mounted relative to said stud, trip means carried by said frame for engaging said transverse means during movement of the grill assemblies with the rotary member whereby said grill assemblies are turned about the axes of the studs, the flange having a gap to permit the turning of said grill assemblies by interengagement of said trip means and said transverse means, and means for engaging said flange-engaging means for completing the inverting of said grill assemblies upon further movement of said rotary member.

2. In a barbecue device, a frame, a rotary member mounted on said frame for rotation about a vertical axis, a plurality of grill assemblies each having a stud projecting from one end, a plurality of retainers carried by the said rotary member, each retainer having an opening and a semi-circular opening axially aligned and spaced, each stud having a pair of axially spaced journals with an enlarged portion therebetween, each stud being removably insertable in one of said retainers with said journals received in said opening and said semi-circular opening, respectively, whereby said stud is rotatable but axially constrained within said retainer, flange means mounted on said frame adjacent said rotary member, means on said grill assemblies for engaging said flange means to prevent turning of said grill assemblies about the axes of said studs, each grill assembly being provided with means transversely mounted relative to said stud, and trip means carried by said frame for engaging said transverse means during movement of the grill assemblies with the rotary member whereby said grill assemblies are turned about the axes of the studs, the flange having a gap to permit turning of said grill assemblies by interengagement of said trip means and said transverse means.

3. In a barbecue device, a frame, a rotary member mounted on said frame for rotation about a vertical axis, a plurality of grill assemblies each having a stud projecting from one end, a plurality of retainers carried by the said rotary member, each stud being removably and rotatably received in one of said retainers for rotation about a horizontal axis, flange means mounted on said frame adjacent said rotary member, an arcuate arm fixedly mounted on each said grill assembly adjacent said stud for engaging said flange means to prevent turning of said grill assembly about the axis of said stud, each grill assembly being provided with pin means extending at approximately 90° relative to the axis of the stud and relative to the orientation of said arm with respect to said stud, and trip means carried by said frame for engaging said pin means during movement of the grill assemblies with the rotary member whereby said grill assemblies are turned about the axes of the studs, the flange having a gap to permit turning of said grill assemblies by interengagement of said trip means and said pin means.

4. In a barbecue device, a frame, a rotary member mounted on said frame for rotation about a vertical axis, a plurality of grill assemblies each having a stud projecting from one end, a plurality of retainers carried by the said rotary member, each stud being removably and rotatably received in one of said retainers for rotation about a horizontal axis, flange means mounted on said frame adjacent said rotary member, an arcuate arm fixedly mounted on each said grill assembly adjacent the stud for engaging said flange means to prevent turning of said grill assembly about the axis of said stud, each grill assembly being provided with pin means extending approximately 90° relative to the axis of the stud and relative to the orientation of said arm with respect to said stud, trip means carried by said frame for engaging said pin means during movement of the grill assemblies with the rotary member whereby said grill assemblies are turned about the axes of the studs, the said flange having a relieved portion to permit the turning of said grill assemblies by interengagement of said trip means and said pin, and a shoulder on said flange at one end of the relieved portion for engaging said arm for completing the inverting of said grill assemblies during further movement of the said rotary member.

5. The combination of claim 4 in which the relieved portion in the said flange is sufficient to permit inverting of the grill assembly during movement of the rotary member but does not permit free rotation of the grill assembly in any one position of the rotary member.

6. The combination of claim 4 in which the said trip means are movable relative to said frame, and means are provided for moving said trip means out of the path of said transverse means whereby the grill assemblies are not turned during movement of the rotary member.

7. In a barbecue device, a frame, a rotary member mounted on said frame for rotation about a vertical axis, a plurality of grill assemblies each having a stud projecting from one end, a plurality of retainers carried by the said rotary member, each stud being removably and rotatably received in one of said retainers, flange means mounted on said frame adjacent said rotary member, means on said grill assemblies for engaging said flange means to prevent turning of said grill assemblies about the axes of said studs, each grill assembly being provided with means transversely mounted relative to said stud, trip means movably carried by said frame for engaging said transverse means during movement of the grill assemblies with the rotary member whereby said grill assemblies are turned about the axes of the studs, and means for moving said trip means out of the path of said transverse means whereby the grill assemblies are not turned during movement of the rotary member, the flange having a relieved portion to permit turning of said grill assemblies by interengagement of said trip means and said transverse means.

8. In a barbecue device, a frame, a rotary member mounted on said frame for rotation about a vertical axis, means for rotating said rotary member, a plurality of grill assemblies each having a stud projecting from one end, each stud having a pair of axially spaced journals, a plurality of retainers carried by the said rotary member, each retainer having an aperture and a semi-circular opening horizontally spaced and aligned, each stud being removably and rotatably received in one of said retainers with the said journals positioned within the said aperture and opening, respectively, flange means mounted on said frame adjacent said rotary member, means on said grill assemblies for engaging said flange means to prevent turning of said grill assemblies about the axes of said studs, each grill assembly being provided with means transversely mounted relative to said stud, trip means movably carried by said frame for engaging said transverse means during movement of the grill assemblies with the rotary member whereby said grill assemblies are turned about the axes of the studs, and means for moving said trip means out of the path of said transverse means whereby the grill assemblies are not turned during movement of the rotary member, the said flange having a relieved portion to permit turning of said grill assemblies by interengagement of said trip means and said transverse means.

9. In a barbecue device, a frame, a rotary member mounted on said frame for rotation about a vertical axis, means for rotating said rotary member, a plurality of grill assemblies each having a stud projecting from one end, each stud having a pair of axially spaced journals, a plurality of retainers carried by the said rotary member, each retainer having an aperture and a semi-circular opening horizontally spaced and aligned, each stud being removably and rotatably received in one of said retainers with the said journals positioned within the said aperture and opening, respectively, flange means mounted on said frame adjacent said rotary member, means on said grill assemblies for engaging said flange means to prevent turning of said grill assemblies about the axes of said studs, each grill assembly being provided with means transversely mounted relative to said stud, trip means movably carried by said frame for engaging said transverse means during movement of the grill assemblies with the rotary member whereby said grill assemblies are turned about the axes of the studs, and a shoulder on said flange at one end of the relieved portion for engaging said flange-engaging means for completing the inverting of said grill assemblies during further movement of the said rotary member.

10. The combination of claim 9 in which the relieved portion in the said flange is sufficient to permit inverting of the grill assembly during movement of the rotary member but does not permit free rotation of the grill assembly in any one position of the rotary member.

11. In a barbecue device for use with a circular barbecue having a center post, the combination of: a frame having means for mounting on said center post, a rotary member mounted on said frame for rotation about a vertical axis relatively coaxial with said center post, a plurality of grill assemblies each having a stud projecting from one end, a plurality of retainers carried by the said rotary member, each stud being removably and rotatably received in one of said retainers whereby the said grill assemblies extend over the said circular barbecue, flange means mounted on said frame adjacent said rotary member, means on said grill assemblies for engaging said flange means to prevent turning of said grill assemblies about the axes of said studs, each grill assembly being provided with means transversely mounted relative to said stud, trip means movably carried by said frame for engaging said transverse means during movement of the grill assemblies with the rotary member whereby said grill assemblies are turned about the axes of the studs, means for moving said trip means out of the path of said transverse means, and a relieved portion in said flange to permit turning of said grill assemblies by interengagement of said trip means and said transverse means.

References Cited in the file of this patent
UNITED STATES PATENTS
1,117,929    Turnbull _____ Nov. 17, 1914